(12) United States Patent
Fowers et al.

(10) Patent No.: US 11,151,445 B2
(45) Date of Patent: Oct. 19, 2021

(54) NEURAL NETWORK PROCESSOR WITH A WINDOW EXPANDER CIRCUIT

(71) Applicant: Microsoft Technology Licensing, LLC, Redmond, WA (US)

(72) Inventors: Jeremy Fowers, Seattle, WA (US); Dan Zhang, Bellevue, WA (US); Mohammadmahdi Ghandi, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 816 days.

(21) Appl. No.: 15/959,210

(22) Filed: Apr. 21, 2018

(65) Prior Publication Data

US 2019/0325297 A1 Oct. 24, 2019

(51) Int. Cl.
*G06N 3/06* (2006.01)
*G06N 3/063* (2006.01)
*G06N 20/10* (2019.01)
*G06N 3/08* (2006.01)

(52) U.S. Cl.
CPC ............... *G06N 3/063* (2013.01); *G06N 3/08* (2013.01); *G06N 20/10* (2019.01)

(58) Field of Classification Search
CPC ........... G06N 3/063; G06N 20/10; G06N 3/08
See application file for complete search history.

(56) References Cited

U.S. PATENT DOCUMENTS

| 5,949,920 A | * | 9/1999 | Jordan | G06T 5/20 382/279 |
| 2002/0067417 A1 | * | 6/2002 | Tan | H04N 3/155 348/308 |
| 2013/0232318 A1 | * | 9/2013 | Sprangle | G06F 9/30025 712/4 |
| 2016/0062947 A1 | | 3/2016 | Chetlur et al. | |

OTHER PUBLICATIONS

L. Lu et al., "Evaluating fast algorithms for convolutional neural networks on FPGAs," in Proc. 25th IEEE Int. Symp. on FieldProgrammable Custom Computing Machines (FCCM), Apr. 2017, pp. 101-108. (Year: 2017).*

(Continued)

*Primary Examiner* — Paulinho E Smith
(74) *Attorney, Agent, or Firm* — Ranjeev Singh; Singh Law, PLLC

(57) ABSTRACT

Neural network processors including a window expander circuit and related methods are provided. The window expander circuit may include a first logic circuit configured to store a set of data elements, corresponding to at least a subset of the input data, into a Q number of logical memories, where each of a P number of data elements of the set of the data elements is stored in each of the Q number of logical memories. The window expander circuit may further include a second logic circuit configured to receive the first set of data elements and additional data elements corresponding to the at least the subset of the input data from the Q number of logical memories and expand the at least the subset of the input data until the at least the subset of the input data is expanded based on a predetermined factor.

20 Claims, 15 Drawing Sheets

(56) References Cited

OTHER PUBLICATIONS

Karim Mohamed Abedallah Ali, Rabie Ben Atitallah, Said Hanafi, Jean-Luc Dekeyser. A Generic Pixel Distribution Architecture for Parallel Video Processing. International Conference on Reconfigurable Computing and FPGAs—ReConFig 2014, Dec. 2014, Cancun, Mexico. (Year: 2014).*

Greg Stitt, Eric Schwartz, and Patrick Cooke. 2016. A Parallel Sliding-Window Generator for High-Performance Digital-Signal Processing on FPGAs. ACM Trans. Reconfigurable Technol. Syst. 9, 3, Article 23 (2016), 23:1-23 (Year: 2016).*

Chetlur, et al., "cuDNN: Efficient Primitives for Deep Learning", In Journal of the Computing Research Repository, Oct. 3, 2014, 9 Pages.

Cho, et al., "MEC: Memory-efficient Convolution for Deep Neural Network", In Proceedings of the 34th International Conference on Machine Learning—vol. 70, Jun. 21, 2017, 10 Pages.

Lai, et al., "CMSIS-NN: Efficient Neural Network Kernels for Arm Cortex-M CPUs", In Journal of the Computing Research Repository, Jan. 20, 2018, 10 Pages.

"International Search Report and Written Opinion Issued in PCT Application No. PCT/US2019/026206", dated Jul. 18, 2019, 15 Pages.

Farabet, et al., "Cnp: An Fpga-Based Processor for Convolutional Networks", In Proceedings of IEEE International Conference on Field Programmable Logic and Applications, FPL, Aug. 31, 2009, 6 Pages.

He, et al., "Deep Residual Learning for Image Recognition", In Journal of the Computing Research Repository, Dec. 10, 2015, pp. 1-12.

Morgan, Timothy P., "Drilling Into Microsoft's Brainwave Soft Deep Learning Chip", Retrieved from <<https://www.nextplatform.com/2017/08/24/drilling-microsofts-brainwave-soft-deep-leaning-chip/>>, Aug. 24, 2017, 8 Pages.

Yiannacouras, et al., "VESPA: Portable, Scalable, and Flexible FPGA-Based Vector Processors", In Proceedings of the International Conference on Compilers, Architectures and Synthesis for Embedded Systems, Oct. 19, 2008, 10 Pages.

Yu, et al., "Vector Processing as a Soft-core CPU Accelerator", In Proceedings of the 16th International Symposium on Field Programmable Gate Arrays, Feb. 24, 2008, 10 Pages.

\* cited by examiner

NEURAL NETWORK PROCESSOR WITH A WINDOW EXPANDER CIRCUIT

BACKGROUND

Neural network technology is used to perform complex tasks such as reading comprehension, language translation, image recognition, or speech recognition. Machine learning services, such as those based on Recurrent Neural Networks (RNNs), Convolution Neural Networks (CNNs), Long Short Term Memory (LSTM) neural networks, or Gated Recurrent Units (GRUs) have been deployed to perform such complex tasks. While these types of neural networks have been deployed, there is a need for continued improvement in the underlying architecture and corresponding instructions to perform these complex tasks.

SUMMARY

In one example, the present disclosure relates to a neural network processor configured to perform convolution operations on input data and N by N matrices, where N is a positive integer greater than one. The neural network processor may include a plurality of multiplier circuits. The neural network processor may further include a window expander circuit. The window expander circuit may include a first logic circuit configured to store a set of data elements, corresponding to at least a subset of the input data, into a Q number of logical memories, where each of a P number of data elements of the set of the data elements is stored in each of the Q number of logical memories, where P is an integer equal to or greater than one and Q is an integer equal to or greater than N. The window expander circuit may further include a second logic circuit configured to receive the first set of data elements and additional data elements corresponding to the at least the subset of the input data from the Q number of logical memories and expand the at least the subset of the input data until the at least the subset of the input data is expanded based on a predetermined factor selected at least to increase utilization of the plurality of the multiplier circuits.

In another example, the present disclosure relates to a method in a neural network processor configured to perform convolution operations on input data and N by N matrices, where N is a positive integer greater than one, where the neural network comprises a plurality of multiply circuits. The method may include automatically determining whether the input data received by the neural network processor requires expansion. The method may further include when the input data requires the expansion: (1) storing a first set of data elements, corresponding to at least a subset of the input data, into a Q number of logical memories, where each of a P number of data elements of the first set of the data elements is stored in each of the Q number of logical memories, where P is an integer equal to or greater than one and Q is an integer equal to or greater than N, (2) shifting the first set of data elements from the Q number of logical memories into a first column of an array structure and storing a second set of data elements, corresponding to the subset of the input data, in the Q number of logical memories, (3) shifting the first set of the data elements from the first column of the array structure into a second column of the array structure and shifting the second set of data elements from the Q number of logical memories into the first column of the array structure, and (4) repeating storing and shifting steps using additional data elements corresponding to the subset of the input data until the subset of the input data is expanded based on a predetermined factor selected at least to increase utilization of the plurality of the multiplier circuits.

In yet another example, the present disclosure relates to a neural network processor configured to perform convolution operations on input data and N by N matrices, where N is a positive integer greater than one. The neural network processor may include a plurality of multiplier circuits and a window expander circuit. The window expander circuit may include a first logic circuit configured to store a set of data elements, corresponding to at least a subset of the input data, into a Q number of logical memories, where each of a P number of data elements of the set of the data elements is stored in each of the Q number of logical memories, where P is an integer equal to or greater than one and Q is an integer equal to or greater than N.

The window expander circuit may further include a second logic circuit configured to receive the first set of data elements from the Q number of logical memories and expand the at least the subset of the input data until the at least the subset of the input data is expanded based on a predetermined factor, where the second logic circuit comprises a rotate circuit and an array structure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
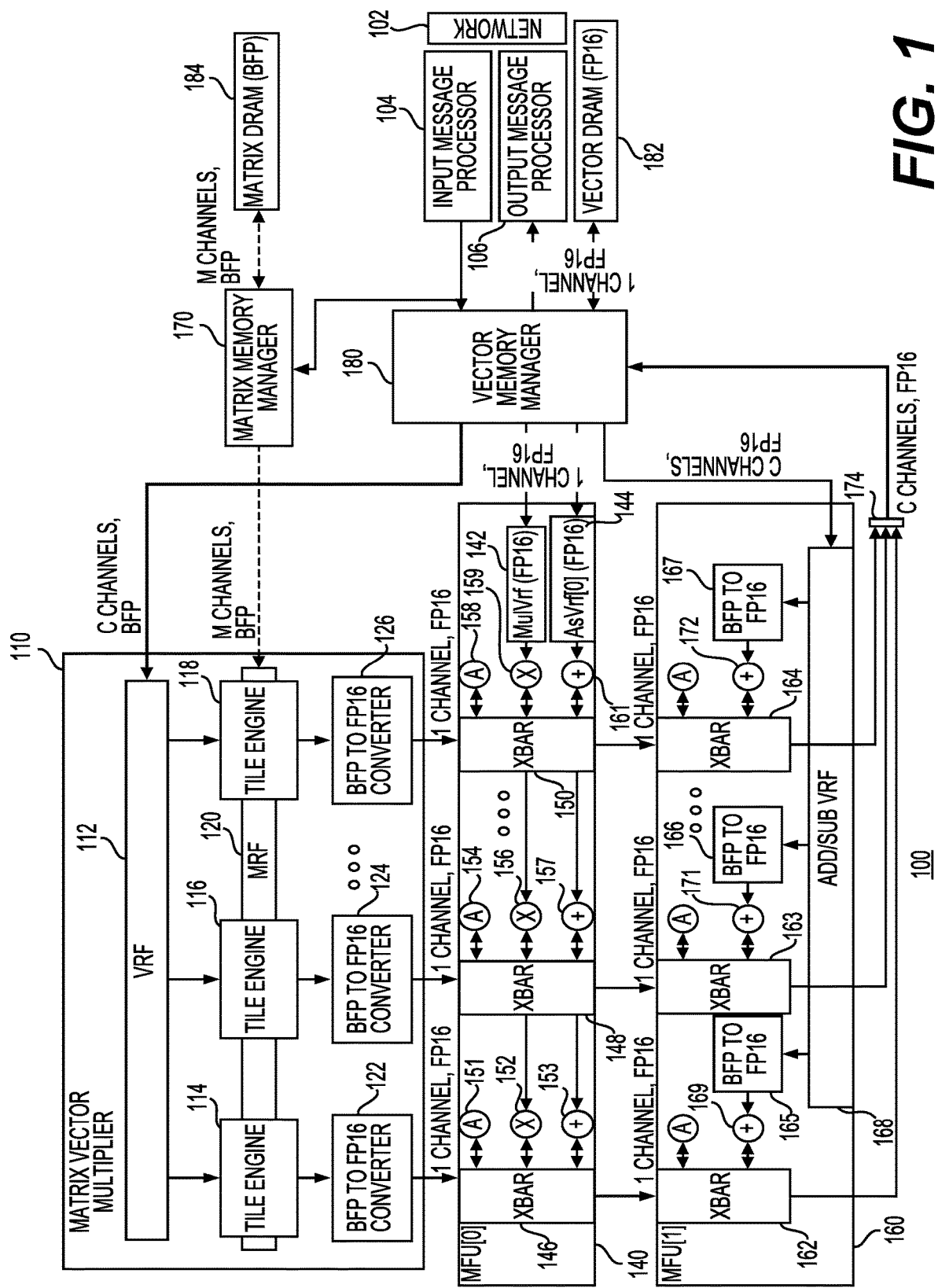
FIG. 1 is a block diagram of a neural network processor in accordance with one example.

Examples disclosed in the present example relate to neural network processors that include a window expander circuit. Convolutional Neural Networks (CNNs) and Recurrent Neural Networks (RNNs) are both widely used computational kernels in mainstream machine learning. CNNs and RNNs may be efficiently expressed in terms of matrix-vector multiplication, however the parallelism and data structures inherent to each differs significantly. Therefore, it is challenging to produce a single tera-flop scale computer architecture that efficiently computes both CNNs and RNNs. This problem is compounded when real time latency requirements are placed on the design. As a result, previous solutions have specialized for CNNs or RNNs without prioritizing strong performance on both. Certain examples disclosed in the present disclosure relate to using system, methods, and components that provide for efficient computation for both CNNs and RNNs. In particular, certain examples relate to the use of a hardware window expander circuit that can be used to expand input data received by the neural network processor.

As an example, the present disclosure describes a neural network processor that leverages the parallelism between individual output activations in a CNN to perform a limited form of matrix-matrix multiplication within an individual CNN evaluation. This parallelism is mapped onto a circuit in the form of an array of quasi-independent matrix-vector multiplication tile engines that receive the same matrix data but different vector data. This approach allows for high utilization at batch=1 for CNN inputs, which in turn delivers high throughput at low latency. This approach is also enabled by a CNN-aware instruction set architecture (ISA) that provides an information-dense expression of CNNs in the same assembly level code that can be used to express RNNs.

The neural network processors described in this disclosure may be implemented using portions or combinations of Field Programmable Gate Arrays (FPGAs), Application Specific Integrated Circuits (ASICs), Erasable and/or Complex programmable logic devices (PLDs), Programmable Array Logic (PAL) devices, and Generic Array Logic (GAL) devices. An image file may be used to configure or re-configure neural network processors, such as FPGAs. The image file or similar file or program may be delivered via a network link or a local link (e.g., PCIe) from a host CPU. Information included in an image file can be used to program hardware blocks of a neural network processor (e.g., logic blocks and reconfigurable interconnects of an FPGA) to implement desired functionality. Desired functionality can be implemented to support any service that can be offered via a combination of computing, networking, and storage resources such as via a data center or other infrastructure for delivering a service.

In one example, neural network processors (e.g., FPGAs) or groups of such neural network processors may be coupled to each other via a low latency network. A converged platform leveraging hundreds to thousands of such neural network processors (e.g., FPGAs) may advantageously offer: (1) significantly reduced training times from exploiting parallelism across hundreds of thousands of nodes, (2) enabling new training scenarios such as online learning in-situ on live data, and (3) training models of unprecedented scale while leveraging flexible and fungible homogeneous FPGA resources in a hyper-scale datacenter spanning hundreds of thousands of servers. In one example, such advantages may be obtained by exploiting unconventional data representations that may leverage the architecture of neural network processors, such as FPGAs.

The described aspects can also be implemented in cloud computing environments. Cloud computing may refer to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model may be used to expose various service models, such as, for example, Hardware as a Service ("HaaS"), Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

Machine learning services, such as those based on Recurrent Neural Networks (RNNs), Convolution Neural Networks (CNNs), Long Short Term Memory (LSTM) neural networks, or Gated Recurrent Units (GRUs) may be implemented using the neural network processors described in this disclosure. In one example, the service-related content or other information, such as words, sentences, images, videos, or other such content/information may be translated into a vector representation. The vector representation may correspond to techniques such as RNN, CNN, LSTM, or GRU. The deep learning models may be trained off-line before service initialization and then may be deployed using the systems and neural network processors described in this disclosure.

In one example, the neural network model may comprise of many layers and each layer may be encoded as matrices or vectors of weights expressed in the form of coefficients or constants that have been obtained via off-line training of a neural network. Programmable hardware logic blocks in the nodes may process the matrices or vectors to perform various operations, including multiply, add, and other operations against input vectors representing encoded information related to the service. In one example, the matrices or vectors of weights may be partitioned and pinned across multiple nodes by using techniques such as graph partitioning. As part of this process, a large neural network may be translated into an intermediate representation (e.g., a graph) and then the intermediate representation may be carved into smaller representations (e.g., sub-graphs) and each of the matrices of weights corresponding to each sub-graph may be pinned to a node's on-chip memories. In one example, the models may be translated into fixed-size matrices and vectors. This way, the nodes' resources may operate on the fixed-size matrices and vectors in parallel.

Taking the LSTM example, an LSTM network may comprise a sequence of repeating RNN layers or other types of layers. Each layer of the LSTM network may consume an input at a given time step, e.g., a layer's state from a previous time step, and may produce a new set of outputs or states. In case of using the LSTM, a single chunk of content may be encoded into a single vector or multiple vectors. As an example, a word or a combination of words (e.g., a phrase, a sentence, or a paragraph) may be encoded as a single vector. Each chunk may be encoded into an individual layer (e.g., a particular time step) of an LSTM network. An LSTM layer may be described using a set of equations, such as the ones below:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} i_t \tanh(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t \tanh(c_t)$$

In this example, inside each LSTM layer, the inputs and hidden states may be processed using a combination of vector operations (e.g., dot-product, inner product, or vector addition) and non-linear functions (e.g., sigmoids, hyperbolic, and tangents). In certain cases, the most compute intensive operations may arise from the dot products, which may be implemented using dense matrix-vector and matrix-matrix multiplication routines. In one example, the processing of the vector operations and non-linear functions may be performed in parallel.

In one example, individual neural network processors may send messages comprising packets directly to each other and thus this may allow the partitioning of even a single neural network across multiple neural network processors without incurring unacceptable latencies. For communicating the neural network processors may use a lightweight protocol, including, for example, RDMA. Parallelization could also be performed within a layer of a neural network by splitting neural weights across multiple neural network processors. As an example, a single CNN or RNN model (e.g., including LSTM weight matrices) may be partitioned and processed using neural network processors.

FIG. 1 is a block diagram of a neural network processor 100 in accordance with one example. Each neural network processor 100 may include an Input Message Processor (IMP) 104 for receiving messages from other processors and an Output Message Processor (OMP) 106 for processing outgoing messages to other processors or components. Such messages may be received and transmitted via network 102. Each neural network processor 100 may further include a matrix vector multiplier (MVM) 110 and two or more multifunction units (MFUs) (e.g., MFU[0] 140 and MFU[1] 160). Each neural network processor 100 may further include a matrix memory manager 170, a vector memory manager 180, a Vector DRAM 182, and a Matrix DRAM 184. In this example, the processor may accept off-chip messages containing auxiliary information such as control and scalar data and payload data (e.g., vectors, matrices, or other tensor data structures). In this example, the incoming messages may be handled by a lightweight input message processor (IMP) 104, which sends the vectors to vector memory manager 180. IMP 104 may send the matrices to matrix memory manager 170.

With continued reference to FIG. 1, each of the matrices may have an N by N size and each of the vectors may have a size of 1 by N. In this example, all instructions corresponding to neural network processor 100 may operate on native-sized data. Logical vectors and matrices corresponding to the applications handled by neural network processor 100 may often be larger than the native size; in these cases, the vectors and matrices are broken up into native-sized tiles. In one example, for matrix vector multiplication, matrix data and vector data may be expressed in block floating point (BFP) format. In this example, the block size of the BFP format data may be equal to the native dimension. Therefore, each native 1 by N vector may have a shared exponent, and each row of an N by N matrix may have a shared exponent. Each of the vector data and the matrix data may have a two's complement mantissa portion, and the mantissa size for the vector data and the matrix data may be different.

MVM 110 may include a vector register file (VRF) 112, a matrix register file (MRF) 120, and tile engines (e.g., tile engines 114, 116, and 118). Tile engines may receive input matrix and input vector data from VRF 112. MVM 110 may further include format converters, as needed, including block floating point (BFP) to floating point (FP) converters. In one example, two internal BFP formats may be used by MVM 110 for expressing its input and output: BFP short, for vector and matrix storage, and BFP long for accumulation. In one example of MVM 110, BFP short may use 81.15 fixed point values with a shared 5 bit exponent, and BFP long may use q34.40 fixed point values with a shared 5 bit exponent. In this example, the matrix-vector multiplication may result in BFP long, which may be converted back to a floating-point format as a final output stage. Thus, the example MVM 110 shown in FIG. 1 may include BFP to FP16 Converters 122, 124, and 126 at the output stages. Tile engines 114, 116, and 118 may, in parallel, provide outputs to the respective converters as shown in the example in FIG. 1. Additional details regarding MVM 110 are provided in FIG. 2 and additional details of VRF 112 are provided in FIGS. 3 and 4. The matrix data may be communicated between Matrix DRAM 184 and Matrix Memory manager 170 using M number of channels.

With continued reference to FIG. 1, each MFU (e.g., MFU[0] 140 and MFU[1] 160) may include crossbars (e.g., crossbars labeled as xbars). MFU[0] 140 may support vector operations, such as vector-vector multiply and addition, a Sigmoid function, a TanH function, a softmax operation, a Rectified Linear Unit (ReLU) operation, and/or an activation block operation. Thus, as shown in FIG. 1, MFU[0] 140 may include crossbars (e.g., xbar 146, 148, and 150) that may stream a vector from its input bus through a pipelined sequence of operations. Thus, a vector may be received via a register file labeled MulVrf 142 or another register file labeled AsVrf[0] 144, and such vectors may be subjected to any of a multiply operation, an addition operation, or some other operation. MFU[0] 140 may include several hardware blocks for performing addition (e.g., 153, 157, and 161). MFU[0] 140 may also include several hardware blocks for performing multiplication (e.g., 152, 156, and 159). MFU[0] 140 may also include several hardware blocks for performing activation (e.g., 151, 154, and 158).

Still referring to FIG. 1, MFU[1] 160 may include crossbars (e.g., xbar 162, 163, and 164) that may allow MFU[1] 160 to receive outputs from MFU[0] 140 and perform additional operations on those outputs and any additional inputs received via ADD/SUB VRF 168. MFU[1] 160 may include several hardware blocks for performing addition (e.g., 169, 171, and 172). MFU[1] 160 may also include several hardware blocks for performing activation. The outputs from MFU[1] 160 received via C channels may be coupled via a multiplexing circuit 174 to vector memory manager 180. Although FIG. 1 shows a certain number of components of neural network processor 100 arranged in a certain manner, there could be more or fewer number of components arranged differently.

Neural network processor 100 may be used to enable issuance of instructions that can trigger millions of operations using a small number of instructions. As an example, Table 1 below shows instructions corresponding to a fully parameterized LSTM:

TABLE 1

```
void LSTM (int steps) {
    for (int t = 0; t < steps; t++) {
        v_rd (s , NeqQ, DONTCARE) ;
        v_wr (s , InitialVrf, 1stm → ivrf_xt) ;
        // xWF = xt * Wf + bf
```

TABLE 1-continued

```
        v_rd (s, InitialVrf, 1stm → ivrf_xt);
        mv_mul (s, 1stm → mrf_Wf);
        vv_add (s, 1stm → asvrf_bf);
        v_wr (s, AddSubVrf, 1stm → asvrf_xWf);
        // xWi = xt * Wi + bi ...
        // xWf = xt * Wo + bo ...
        // xWc = xt * Wc + bc ...
        // f gate → multiply by c_prev
        v_rd (s, InitialVrf, 1stm → ivrf_h_prev);
        mv_mul (s, 1stm → mrf_Uf);
        vv_add (s, 1stm → asvrf_xWf);
        v_sigm (s); // ft
        vv_mul (s, 1stm → mulvrf_c_prev);
        v_wr (s, AddSubVrf, 1stm → asvrf_ft_mod);
        // i gate ...
        // o gate ...
        // c gate → store ct and c_prev
        v_rd (s, InitialVrf, 1stm → ivrf_h_prev);
        mv_mul (s, 1stm → mrf_Uc);
        vv_add (s, 1stm → asvrf_xWc);
        v_tanh (s);
        vv_mul (s, 1stm → mulvrf_it);
        vv_add (s, 1stm → asvrf_ft_mod); // ct
        v_wr (s, MultiplyVrf, 1stm → mulvrf_c_prev);
        v_wr (s, InitialVrf, 1stm → ivrf_ct);
        // produce ht, store and send to network
        v_rd (s, InitialVrf, 1stm → ivrf_ct);
        v_tanh (s);
        vv_mul (s, 1stm → mulvrf_ot); // ht
        v_wr (s, InitialVrf, 1stm → ivrf_h_prev);
        v_wr (s, NetQ, DONTCARE);
    }
}
```

Although Table 1 shows a certain number of instructions having a certain format, neural network processor 100 may execute more or fewer instructions having a different format to accomplish the same objectives.

Table 2 below shows how to compute a 1×1 convolution as part of a CNN evaluation.

TABLE 2

```
SetIterations(bs, args->iterations);
SetRowsCols(bs, 1, args->cols);
// Compute
v_rd_inc(bs, ISA_Mem_MvmInitialVrf, mvuivrf_input, args->cols);
mv_mul(bs, mrf_weights);
vv_add_inc(bs, ISA_Mem_AddSubVrf_0, asvrf0_bias, 0);
vv_add_inc(bs, ISA_Mem_AddSubVrf_1, asvrf1_residual, 1);
```

TABLE 2-continued

```
v_relu(bs);
v_wr_inc(bs, ISA_Mem_NetOutputQ, DONTCARE, DONTCARE).
```

As shown in the table above, the number of iterations over a chain of instructions for the computation may be specified. Next, as needed, the native dimension of each instruction chain may be scaled by a column scaling factor. And after reading the vector data from the vector register file it may be multiplied with the weights retrieved from the matrix register file. After performing additional operations as required by the CNN evaluation, the output may be provided. As an example, a pointwise Rectified Linear Unit (ReLU) operation may be performed for each element of the vector data.

Table 3 below shows how to compute an N×N convolution as part of a CNN evaluation. The instructions below that are similar to the 1×1 convolution are not described again. The Set2dWindows instruction may be used to set the total window size and then SetIterations instruction may be used to slide that window across the input volume. The *_inc instructions (e.g., v_rd_inc and v_add_inc) may be used to increment the instruction's address based on the stride. As an example, a stride of 2 may result in the skipping of every other vector in the vector register file that is used to store vector data for operations, such as addition.

TABLE 3

```
SetRowsCols(bs, 1, args->windowCols * args->windowCols * args->volumeDepth);
Set2dWindow(bs, args->windowCols * args->volumeDepth, input_cols);
SetIterations(bs, output_cols);
for (unsigned imageRow = 0; imageRow < output_rows; imageRow++)
{
    for (unsigned filter = 0; filter < args->filterCount; filter++)
    {
        v_rd_inc(bs, ISA_Mem_MvmInitialVrf, ivrf_input + imageRow *
args->windowStride * input_cols, args->volumeDepth * args->windowStride);
        mv_mul(bs, mrf_weights + filter * args->windowCols * args->windowCols * args->volumeDepth);
        vv_add_inc(bs, ISA_Mem_AddSubVrf_0, asvrf0_bias + filter, 0);
        v_relu(bs);
        v_wr_inc(bs, ISA_Mem_Dram, dram_buffer_wr_ptr + filter,
output_depth);
    }
    dram_buffer_wr_ptr += output_cols * output_depth;
}
```

Figure 2:
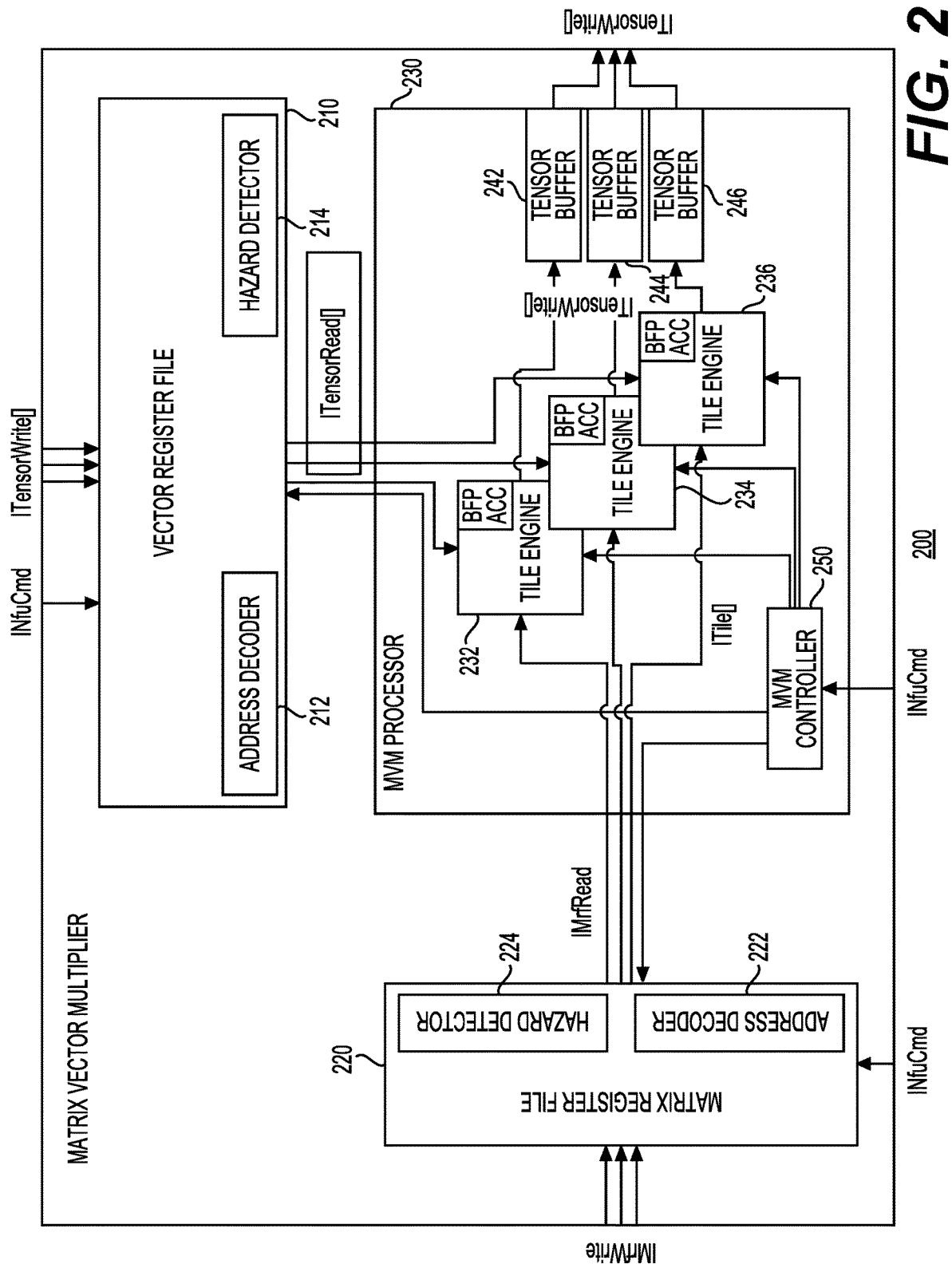
FIG. 2 is a block diagram of a matrix-vector multiplier (MVM) in accordance with one example.

FIG. 2 is a block diagram of a matrix-vector multiplier (MVM) 200 in accordance with one example. In this example, MVM 200 may be used to implement MVM 110 of FIG. 1. MVM 200 may include a vector register file (VRF) 210, a matrix register file (MRF) 220, and an MVM processor 230. VRF 210 may further include an address decoder 212 and a hazard detector 214. VRF 210 may receive both commands and vector data, such as tensors. MRF 220 may include an address decoder 222 and a hazard detector 224. MRF 220 may receive both commands and matrix data. MVM processor 230 may include tile engines 232, 234, and 236. MVM processor 230 may also include buffers for receiving and providing tensors (e.g., tensor buffers 242, 244, and 246). MVM processor 230 may further include an MVM controller 250. In this example, MVM 200 may instantiate a series of tile engines, each of which may be designed to accelerate a native-sized MVM. In this example, each tile engine is made up of a series of dot product units (DPUs), such that each dot product unit may be responsible for the dot product computation that corresponds to one native row in the matrix tile. In one example, when neural network processor 100 is implemented using an FPGA, a small set of BRAMs and DSPs may be configured to create a tile engine. As an example, each may include block random-access memories (BRAMs) and processing logic blocks (e.g., digital signal processors (DSPs)). Processing logic blocks may be used to multiply an input vector with a row of weights. The output of processing logic blocks may be added using an adder. Thus, in this example, each tile may perform a point-wise dot product operation. The dot product units may be composed of lanes of parallel multipliers that may feed into an accumulation tree. These lanes may provide parallelism within the columns of a row of a matrix tile. In this manner, MVM 200 may exploit at least four dimensions of parallelism: inter-MVM, MVM tiling, across the rows of a tile, and within the columns of the row.

MRF 220 may include several matrix register files that may be configured to supply matrix data or elements to dot product units within each tile. Each multiplier may receive one vector element from VRF 210 per cycle and one matrix element from one of the matrix register files per cycle. The matrix elements may be delivered by a dedicated port of the matrix register file positioned adjacent to that multiplier. MRF 220 may be organized as follows: stored matrices may be divided into native-sized tiles and each tile may be stored in only a single tile engine. The matrix stored in a given tile engine may be viewed as an MRF bank. Each dot product unit may be associated with a sub-bank of the MRF that holds one row of each matrix tile in that MRF bank. Rows may be statically assigned to dot product units, such that the first dot product unit contains the first row of every matrix tile in the MRF bank. Finally, the elements of the row may be interleaved in an SRAM such that the SRAM read port can be directly connected to multiplier lanes by wires alone. The writes to the matrix register file may be handled differently since matrix data for writing to MRF 220 may come from off-chip memory, such as DRAM. Although FIG. 2 shows a certain number of components of MVM 200 arranged in a certain manner, there could be more or fewer number of components arranged differently.

From an operational point of view, as described above, MVM 200 instantiates a series of matrix-vector tiles, each of which are designed to accelerate a native-sized MVM. In turn, each tile engine includes a series of dot product engines. In one example, this may be accomplished using a hierarchical decode and dispatch architecture. Thus, in a case where neural network processor 100 is implemented based on an FPGA, a control processor may be realized using an off-the-shelf Nios II/f processor that is paired with custom code. A top-level scheduler associated with the control processor may receive a stream of instructions that may be grouped in chains. After decoding the instructions, the top-level scheduler may dispatch distributed control signals to a set of second-level schedulers and to another set of second-level decoders. These second-level schedulers and decoders may dispatch additional distributed control signals to the lowest level decoders. In the example implementation using the Nios processor, the Nios processor may stream T iterations of N instructions into the top-level scheduler. Next, the top-level scheduler may dispatch the MVM-specific portion of instructions to a second-level scheduler, which may expand operations along the target matrix's N rows and N columns. These MVM schedules may be mapped to matrix-vector tile engines and the operations may be dispatched to a set of decoders each for the tile engines and their associated vector register files and accumulation units. The set of decoders may generate control signals that fan out into the data plane, with each tile engine dispatcher fanning out to hundreds of dot product units that may read the vector data from the vector register file and write the vector data back to the vector register file.

Figure 3:
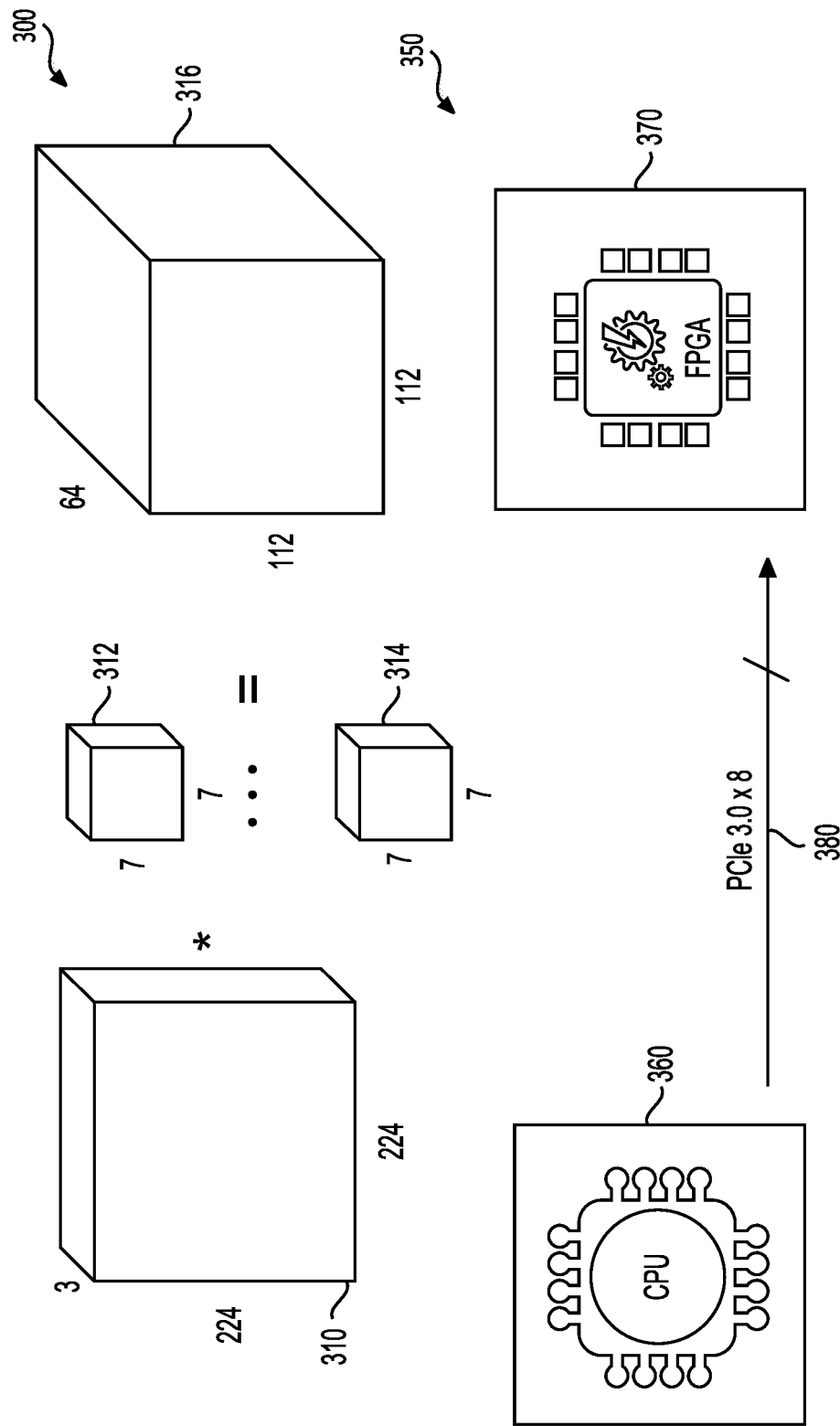
FIG. 3 is a block diagram of a vector memory manager with a window expander circuit in accordance with one example.

Native vectors may have a size of 1 by N and native matrices may have a size of N by N, and all instructions for neural network processor 100 may operate only on native-sized data. Logical vectors and matrices in applications may often be larger than the native size; in these cases, the vectors and matrices may be broken up into native-sized tiles. Conversely, in certain instances logical vectors may be much smaller than the native size. As an example, image classification inference models, such as ImageNet models (e.g., ResNet-50) may have layers where the logical vectors are relatively smaller than the native-sized data. As an example, FIG. 3 is a diagram showing convolution for the first layer of the 50-layer ResNet-50 neural network. This convolution includes convolving 224 by 224 by 3 image data 310 with 7 by 7 kernels 312 and 314 to generate 112 by 112 by 64 results 316. Computing this convolution in software may introduce unacceptable latency. In CNNs, typically convolution operations dominate overall inference time. One way of executing CNNs on CPUs, GPUs, or ASICs is to transform these convolution operations into faster General Matrix to Matrix Multiplication (GEMM) operations. This requires the original matrix to be changed such that it increases the input size by $N^2$, where N is the size of the convolution window. The cost of increased data size and the cost of data transfer can be a significant bottleneck for larger N or if the hardware has sufficiently high GEMM throughput. Certain solutions targeting FPGA or ASIC implement the convolution operation in hardware, thus removing the need to perform GEMM, but that may reduce hardware flexibility. The examples described in the present disclosure may advantageously enable hardware multipliers (e.g., GEMM multiplier arrays) to achieve high performance with greater flexibility by moving only the window expansion operation to hardware.

Custom convolution hardware requires many dedicated multiply-accumulate (MAC) units for high performance, but these units would otherwise sit idle when operations other than convolutions are executed. Instead, certain example neural network processors described in the present disclosure only move the window expansion component to custom hardware and transform the convolution operation into a GEMM operation, allowing existing MAC units to be used and enabling hardware optimized for GEMMs to execute convolutions efficiently. One of the aspects to accomplish this approach is the design of the window expansion array, which allows for high-throughput expansion (up to 1 expanded window per cycle) at custom window sizes and strides with low area cost.

With continued reference to FIG. 3, in a situation where the neural network processor receives data from a host (e.g., CPU 360) via a high-speed data link (e.g., PCIe 3.0 link 380), even such a high-speed link may only be capable of transmitting sixteen floating-point data elements per cycle. Thus, a neural network processor that has multiple tile engines (e.g., 114, 116, and 118 of FIG. 1) only some of the multipliers in one tile engine may be kept busy at a time and the remaining multipliers in the other tile engines may not be utilized during the processing of layer a deep neural network, such as ResNet50 layer 1. Accordingly, in one example of the present disclosure, the host is configured to transmit via the high-speed data link raw 224 by 224 by 3 matrices data in a floating-point format. The received raw data is then expanded via a window expander circuit as part of the hardware node (e.g., FPGA 370). In this example, the high-speed data link (e.g., PCIe 3.0 link 380) may transfer 7880 MB/s from the host to the FPGA 370. The raw input data may be expanded using the window expander circuit provided as a part of FPGA 370. This may advantageously reduce the latency associated with processing image volume data as part of the convolution operations associated with a deep neural network including convolution layers with varying sizes and shapes, such as ResNet50. Although FIG. 3 describes a CPU as the host, other types of processors or combinations thereof may also be used. In addition, although FIG. 3 shows an FPGA that is coupled via the high-speed link to the host, other types of hardware, including GPUs or ASICs may also be used as part of this example.

Figure 4:
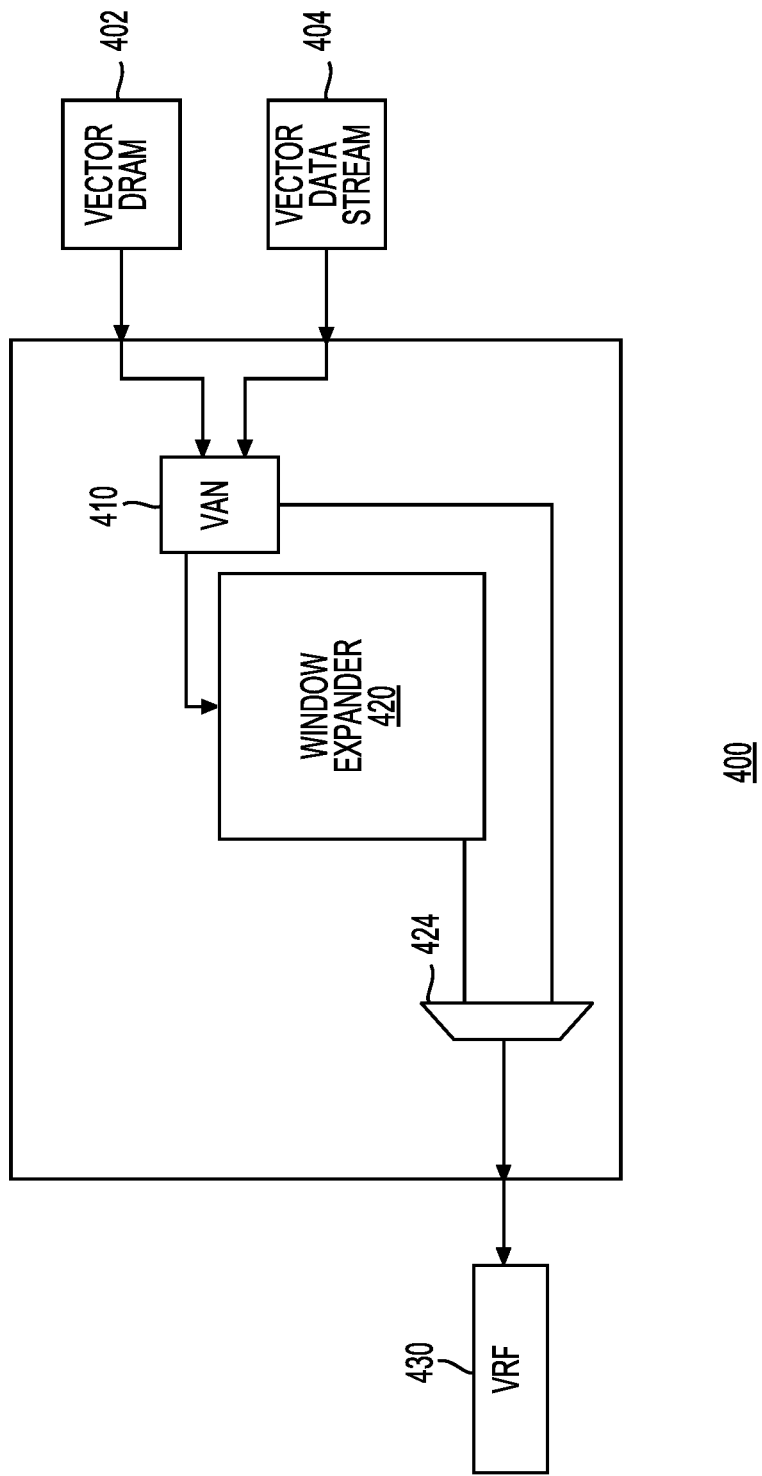
FIG. 4 is a block diagram of a portion of a vector memory manager in accordance with one example.

FIG. 4 is a block diagram of a portion of a vector memory manager 400 in accordance with one example. In this example, a window expander circuit 420 may be included as part of vector memory manager 400. Data elements may be received for processing by window expander circuit 420 via vector DRAM 402 or through the vector data stream 404. The data elements (e.g., 224×224×3 image data) may be forwarded by a vector arbitration network (VAN) 410 to either the window expander circuit 420 or not. When the data elements are forwarded to the window expander circuit 420, the data may be expanded as described further below. The expanded data may be coupled to an input of a multiplexer 424. Multiplexer 424 may also receive the unexpanded data—relating to a situation where the data was not subjected to processing by the window expander circuit 420. The output vector data may be stored in vector register file (VRF) 430 or directly provided to a multiplier. Although FIG. 4 shows window expander circuit 420 as part of vector memory manager 400, the window expander circuit may be implemented differently. As an example, the window expander circuit may be a standalone circuit that could be coupled via other circuit components, such as multiplexers to the vector register file.

Figure 5:
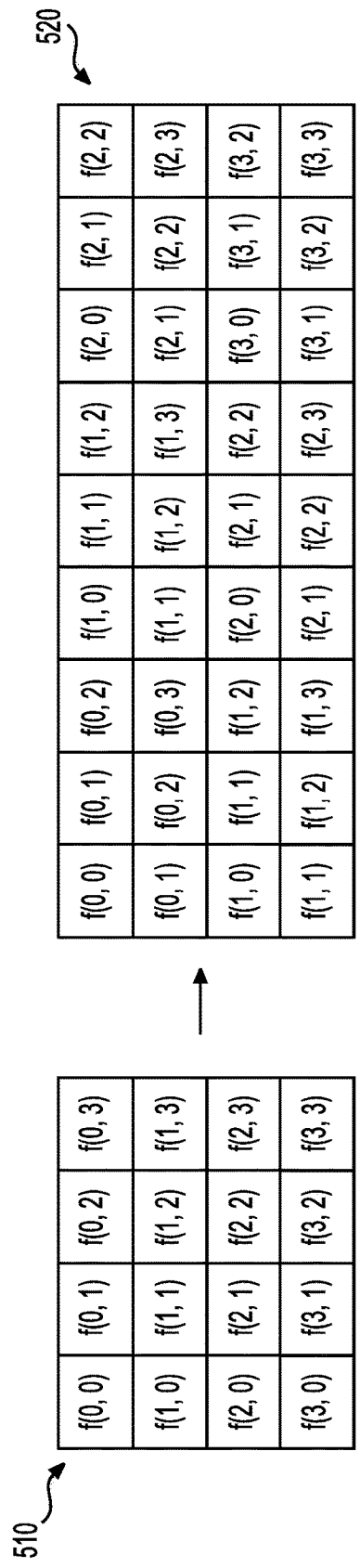
FIG. 5 shows the expansion of a feature map into an expanded feature map according to one example.

FIG. 5 shows the expansion of a feature map 510 into an expanded feature map 520 according to one example. The expanding operation may advantageously increase the dataset size and reduce locality. In addition, in one example, window expander circuit 420 may be configured to expand a feature map 510 into an expanded feature map 520 in a way that the expansion scales with the size of the convolution kernel (e.g., for a 7 by 7 kernel, the expanded vector may be 49 multiplied by an expansion factor). Also, each of the values in the expanded feature map 520 may only be accessed once as opposed to multiple accesses to the same values.

Figure 6:
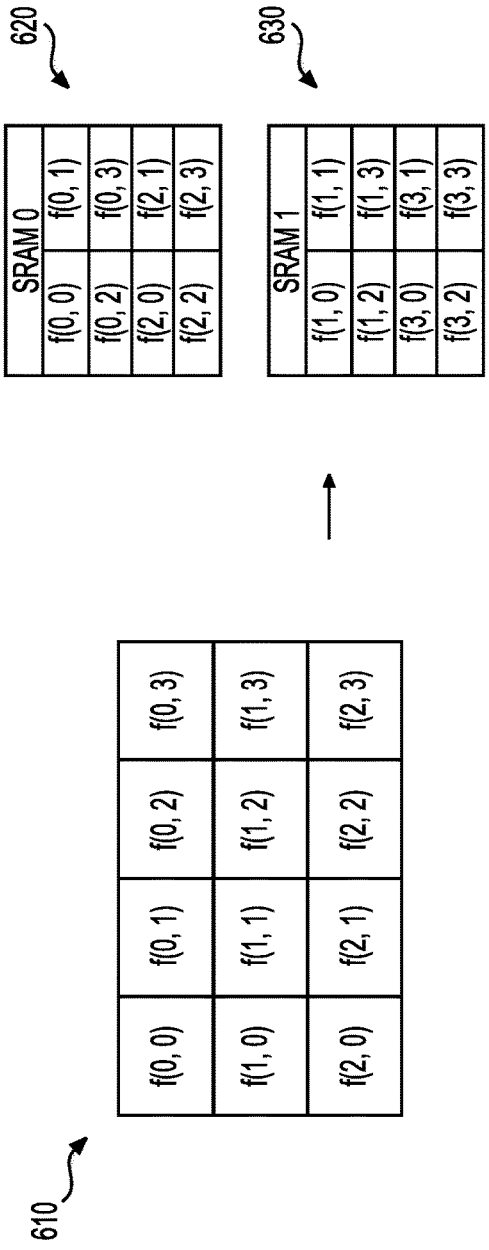
FIG. 6 shows an example of a window expander circuit's memory layout.

FIG. 6 shows a simplified example of an example window expander circuit's memory layout with respect to a 2 by 2 kernel. Assuming a 2 by 2 kernel with a stride 2, the logic (e.g., a finite-state machine (FSM)) associated with the window expander circuit 420 may pack two features (which may be expressed as words or some other suitable data type) per entry into a memory (e.g., an SRAM). Thus, in this example, 8 rows may be split among two SRAMs (e.g. SRAM 0 and SRAM 1). Each SRAM may store 8/2=4 rows. Thus, SRAM 0 may store expanded features 620 and SRAM 1 may store expanded features 630. As shown in this example, each row is mapped contiguously on a single SRAM. In this example, the top row including the features (f(0,0), f(0,1), f(0,2), and f(0,3)) may be expanded into the top two rows of SRAM 0. Next, the second row from the top of the features (f(1,0), f(1,1), f(1,2), and f(1,3)) may be expanded into the top two rows of SRAM 1. Next, the third row from the top of the features (f(2,0), f(2,1), f(2,2), and f(2,3)) may be expanded into the bottom two rows of SRAM 0. Finally, in this example, the fourth row from the top of the features (f(3,0), f(3,1), f(3,2), and f(3,3)) may be expanded into the bottom two rows of SRAM 1. Although FIG. 6 shows one way of arranging memory (e.g., SRAM) and one way of expanding the features using a window expander circuit, other arrangements of the memory and other ways of expanding the features may also be used.

Figure 7:
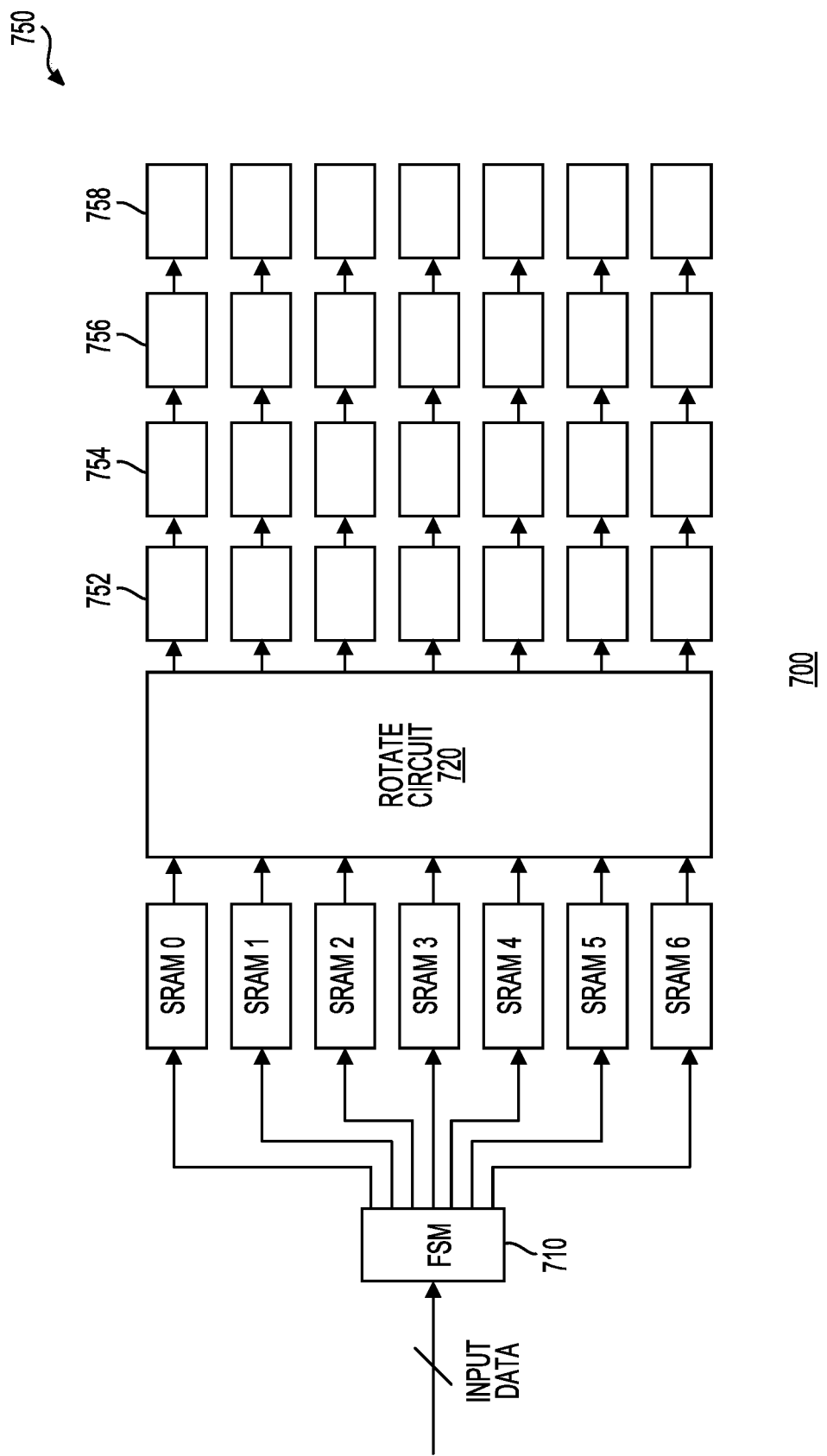
FIG. 7 shows a diagram of a window expander circuit in accordance with one example.

FIG. 7 shows a diagram of a window expander circuit 700 in accordance with one example. This example makes the assumptions shown in Table 4 below with respect to the convolution operations performed on the input data (e.g., the input image volume shown in FIG. 3).

TABLE 4

| Input x | Input y | Input z | Padding | Stride | Filter x | Filter y | Number of Filters |
|---|---|---|---|---|---|---|---|
| 224 | 224 | 3 | 3 | 2 | 7 | 7 | 64 |

Window expander circuit 700 may include a finite state machine (FSM) 710 configured to receive input data from either a high-speed link (e.g., PCI express) or another source. For convolution operations based on assumptions shown in Table 4, window expander circuit 700 may further include seven logical SRAMs (SRAM 0, SRAM 1, SRAM 2, SRAM 3, SRAM 4, SRAM 5, and SRAM 6). Two features per entry may be stored in each of these SRAMs to handle stride 2 (e.g., in a similar fashion as explained with respect to FIG. 6). Window expander circuit 700 may further include a rotate circuit 720. In one example, rotate circuit 720 may be implemented using a barrel rotator with three stages in which each stage optionally rotates by 4, 2, or 1. Alternatively, rotate circuit 720 may be implemented using a barrel rotator with six stages such that each state optionally rotates by 1. Before the start of each row, rotate circuit 720 may be configured. Thus, in one example, the configuration may relate to an extent (e.g., a fixed amount for an entire row of data) of the rotation provided by rotate circuit 720. After a row is complete, the rotation amount may be incremented by the stride (in this example by 2). The rotation amount wraps around after reaching a certain value, such as Q (e.g., for Q=7, rotating by 7 is equivalent to rotating by 0). In addition, before the start of each row, for example when the sliding window reaches the end of the row, the pipeline may be flushed. Window expander circuit 720 may further include an array structure 750 including registers or similar temporary storage to store features that are being output via rotate circuit 720.

Figure 8:
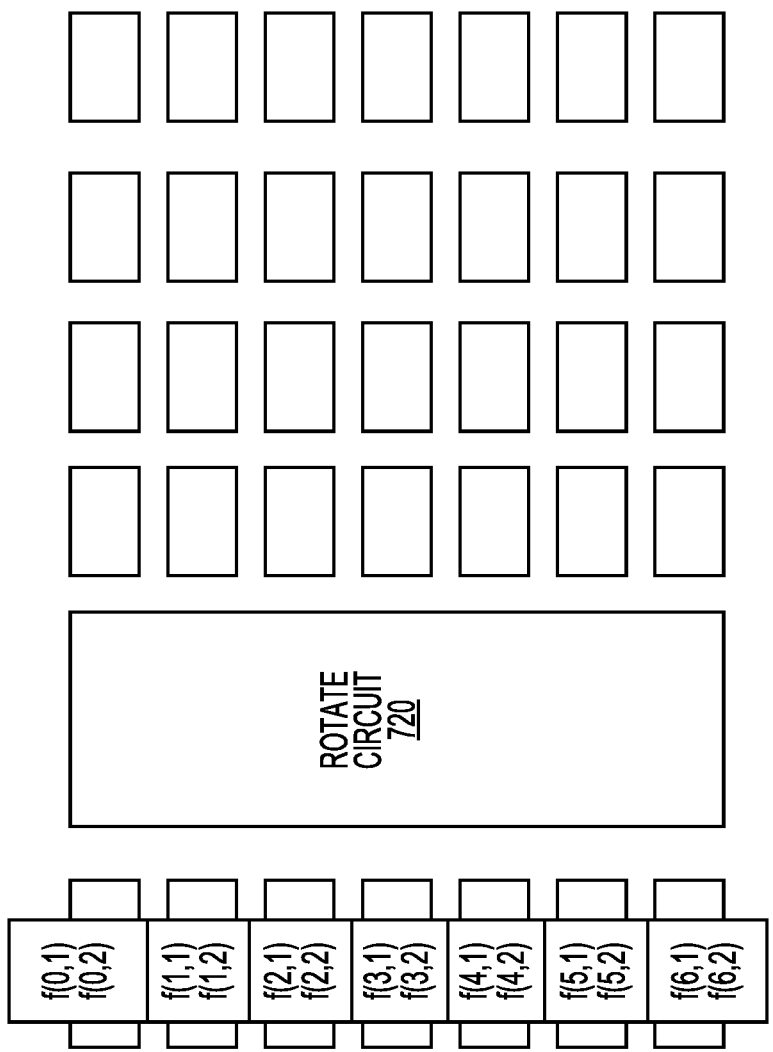
FIGS. 8-15 provide additional examples concerning the operation and configuration of a window expander circuit.
Figure 9:
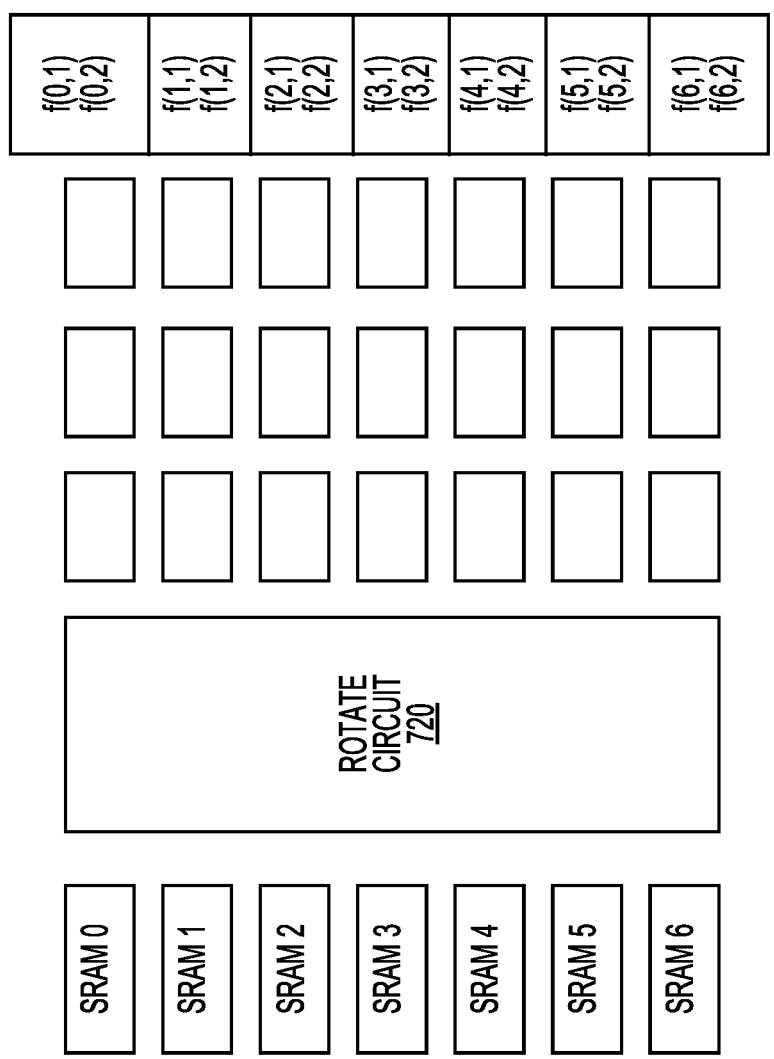
Figure 10:
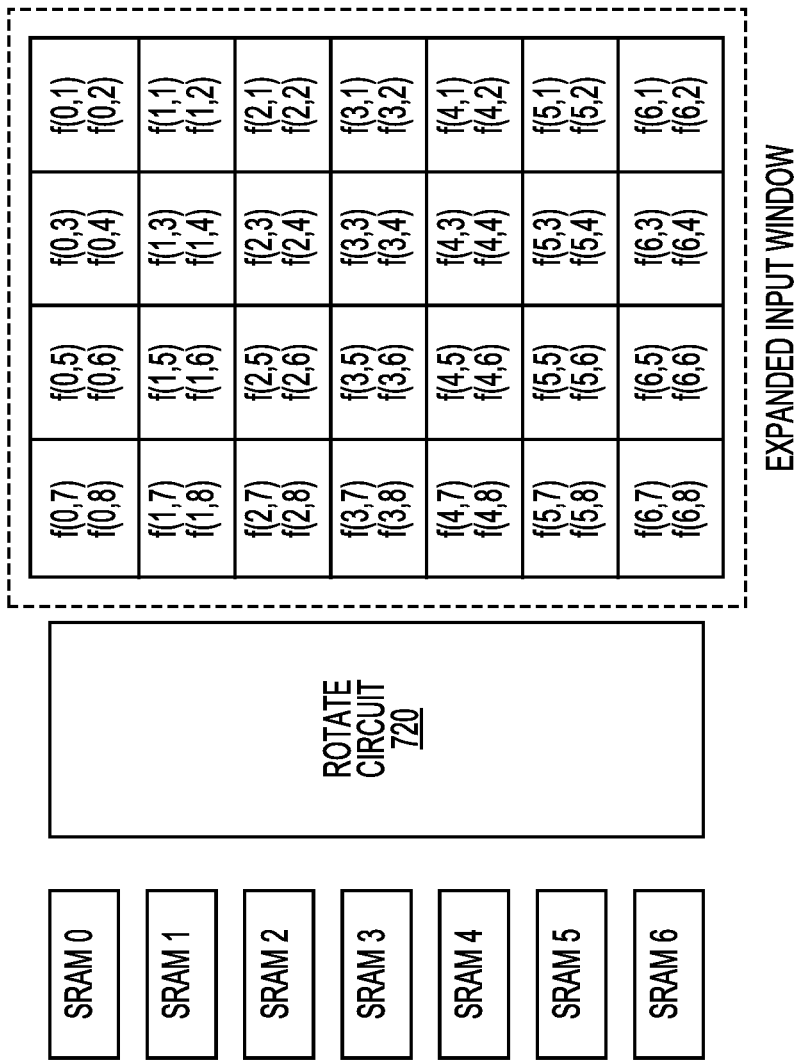
Figure 11:
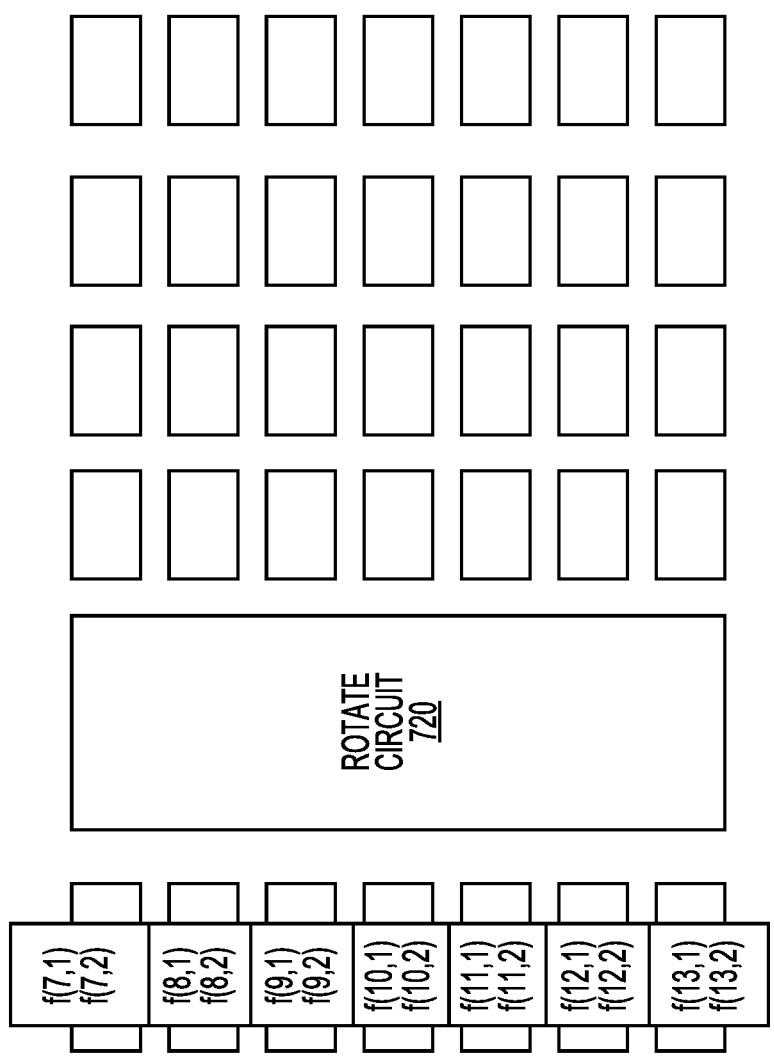
Figure 12:
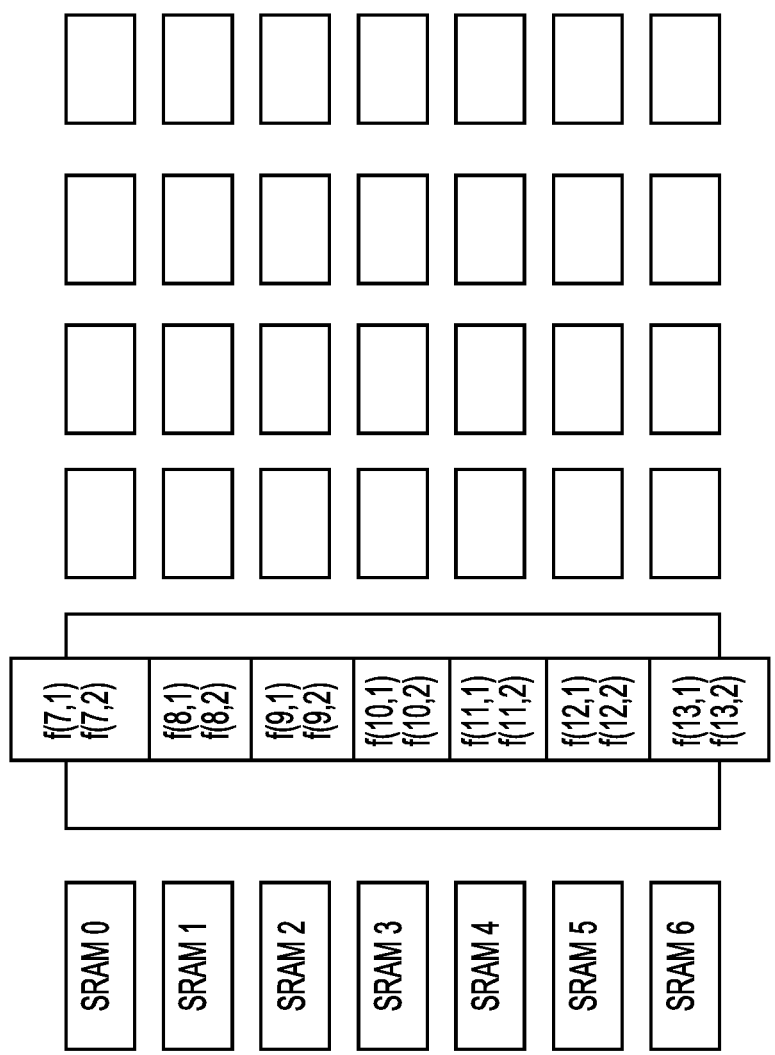
Figure 13:
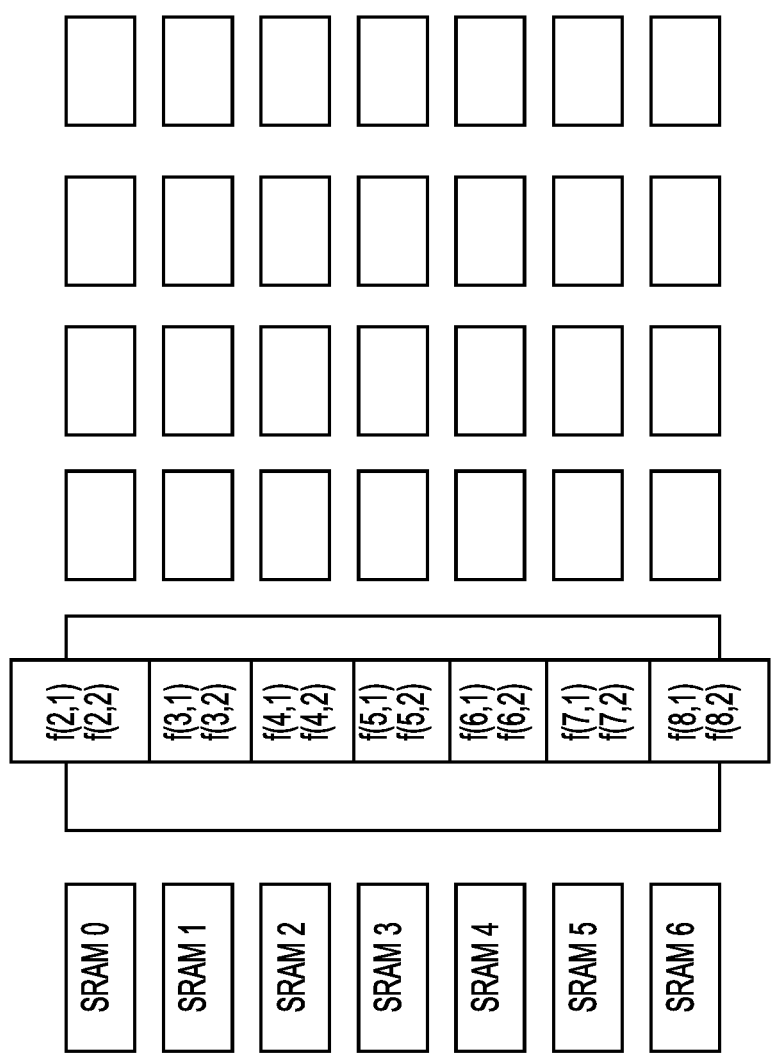
Figure 14:
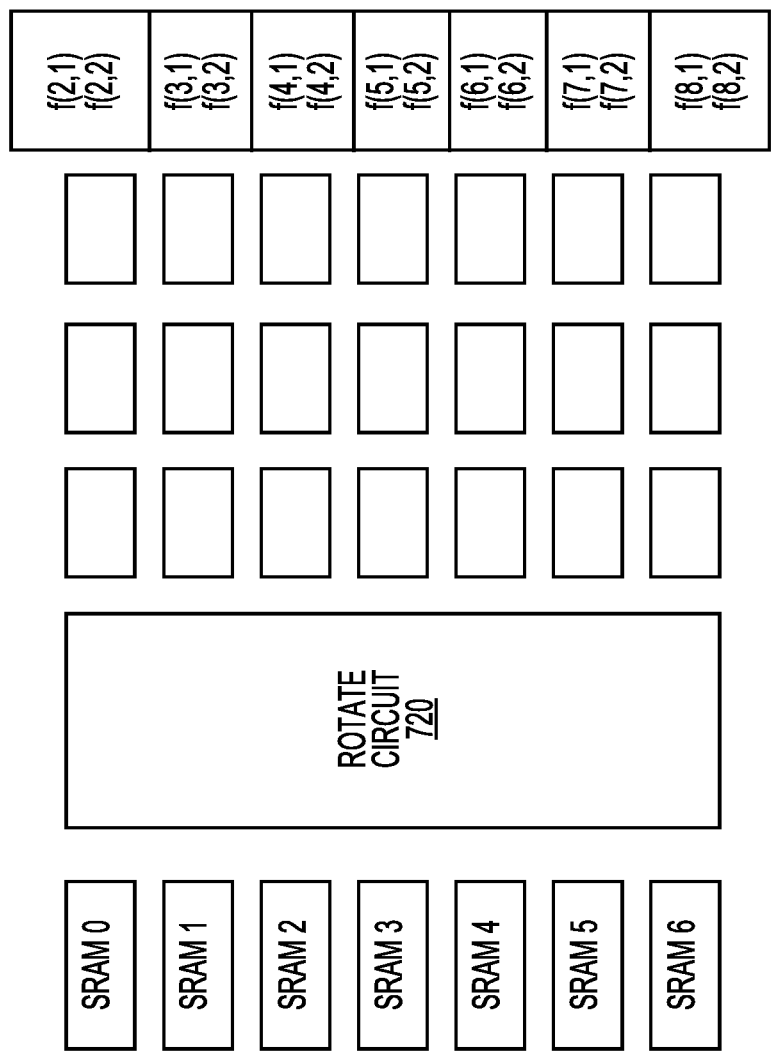
Figure 15:
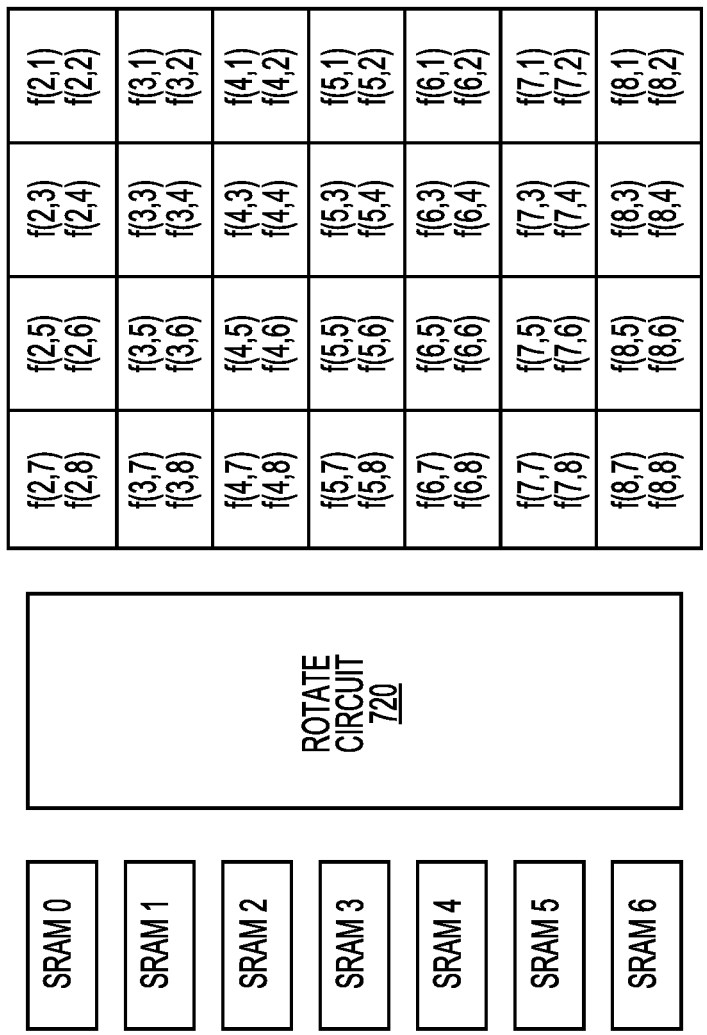

FIGS. 8-15 provide additional details concerning the operation and configuration of window expander circuit 700. In this example, FIGS. 8 and 9 show the data movement for one column of features (e.g., the very first column of features read at the beginning of an expansion operation). Each cycle, more data is read from the SRAM arrays such that the multiple overlapping operations are performed in parallel. As an example, these overlapping operations are shown in FIG. 10 (four overlapping operations), which comprise a fully expanded convolution window. Thus, in this example, each cycle, the column of the features shifts one stage to the right, including the rotator. Each column of boxes in the array structure represents a pipeline stage, such that it takes rotate_cycles+4 cycles for the data to move from the SRAMs (as shown in FIG. 8) to the end of the array structure (as shown in FIG. 9). In this example, when the end of an input matrix row is reached, the rotate circuit 720 and the array structure may be flushed. Thus, in this example, besides the data in the array structure, any residual data in the rotate circuit is also cleared by the flush operation. In addition, the finite state machine (e.g., FSM 710 of FIG. 7) is configured to increment the rotation amount by the stride (e.g., two in this case). In this example, since, as shown in FIG. 9, the end of the first input matrix row is reached, the rotate amount is incremented from 0 to 2. FIG. 11 shows the features read at the start of the second input row, after the end of the first input row is reached; before reading the second input row, the window expander circuit is flushed, and the FSM is configured for the second input row. As part of FIGS. 11-15, the movement of the second input row is shown until it is expanded. To account for the stride of 2, the FSM is configured to increment the rotation amount by the stride of 2. For a different set of convolution operations, where the stride is 4 or some other value, the FSM may be configured differently. FIG. 15 shows the fully expanded second row of input data. As additional rows of input data are received they may similarly be expanded.

Thus, the operation of window expander circuit 700 is explained by taking an example of an image processing application in which RGB pixel values are the features that are being convolved with kernels. Also, for this example, it is assumed that each pixel is expressed in 16-bit values. Once the pipeline including the pixel values is full, each cycle the window expander circuit may produce one expanded window input based on the assumptions for the convolution operation as shown in Table 4. In this example, the expanded image input data (e.g., pixel values) may be equal to 7×7×3=147 16-bit values. For the window expander circuit 700 shown in FIG. 7, using seven read ports for the seven SRAMs, two columns of pixel values may be read per cycle. The expanded inputs may be stored in the vector register file or the matrix register file, as appropriate, of a neural network processor, such as neural network processor 100. The multiplier circuits provided as part of the tile engines in the neural network processor may then be used to perform the multiply-accumulate operations to generate output results for the convolutional layer being processed.

Figure 16:
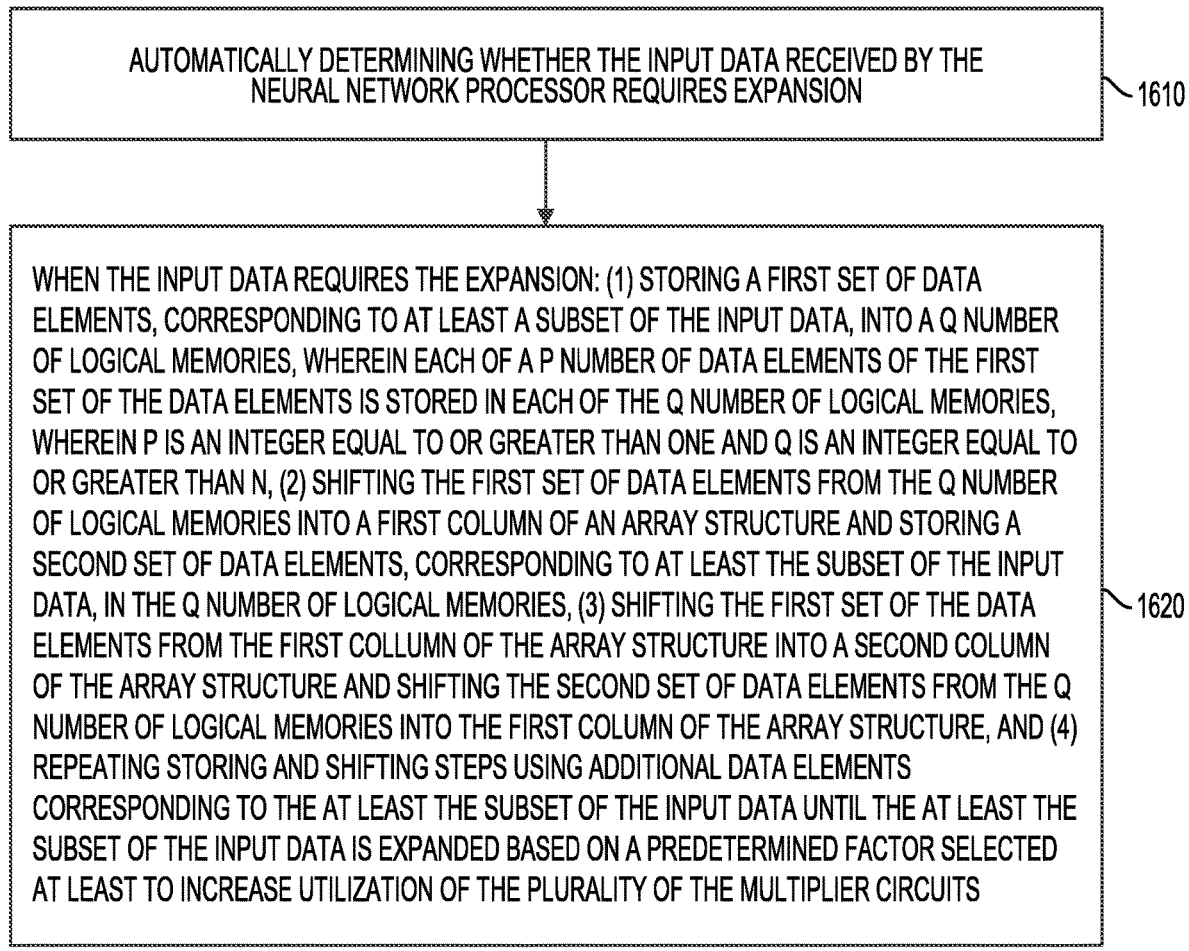
FIG. 16 shows a flow diagram of a method in accordance with one example.

FIG. 16 shows a flow diagram of an example method in a neural network processor configured to perform convolution operations on input data and N by N matrices. Step 1610 may include automatically determining whether the input data received by the neural network processor requires expansion. In one example, this step may be performed using the hierarchical decoding as described earlier. Thus, a top-level scheduler may dispatch the MVM-specific portion of instructions to a second-level scheduler, which may expand operations along the target matrix's N rows and N columns. This step may include determining whether the operations require expanding input data prior to the input data being processed by multipliers that are part of the various MVMs.

Step 1620 may include when the input data requires the expansion: (1) storing a first set of data elements, corresponding to at least a subset of the input data, into a Q number of logical memories, where each of a P number of data elements of the first set of the data elements is stored in each of the Q number of logical memories, where P is an integer equal to or greater than one and Q is an integer equal to or greater than N, (2) shifting the first set of data elements from the Q number of logical memories into a first column of an array structure and storing a second set of data elements, corresponding to the subset of the input data, in the Q number of logical memories, (3) shifting the first set of the data elements from the first column of the array structure into a second column of the array structure and shifting the second set of data elements from the Q number of logical memories into the first column of the array structure, and (4) repeating storing and shifting steps using additional data elements corresponding to the at least the subset of the input data until the at least the subset of the input data is expanded based on a predetermined factor selected at least to increase utilization of the plurality of the multiplier circuits.

In this example, this step may be performed using window expander circuit 720. Thus, as explained earlier with respect to FIGS. 5-15 input data (e.g., data corresponding to input rows) may be stored in logical memories and expanded by a predetermined factor. In this example, as part of this step the predetermined factor may be selected at least to increase utilization of the plurality of multiplier circuits. In one example, this factor may be derived by comparing a size of the kernel (e.g., 7 by 7) to the native dimension of the multiplier circuits, which may be 128 data elements in one example. Thus, as described earlier by expanding the input data to a 147 data elements or feature values (e.g., pixel values), the 147 data elements may be split into two 128 data element vectors and then processed by the MVM described earlier with respect to FIGS. 1-2. In this way, a layer of a neural network, such as ResNet50 layer 1 may be convolved using the neural network processor of FIG. 1 in a manner that achieves lower processing time than otherwise achievable. The determination of the predetermined factor may also consider the dimension of the vector data for the remaining layers of the neural network. Thus, in one example, by analyzing the size of the kernel and the size of the input data for the various layers of a multi-layer neural network, an appropriate amount of selective expansion of the input data may be accomplished. Although FIG. 16 describes a certain number of steps performed in a certain order, additional or fewer steps in a different order may be performed. In addition, in one example each of these steps may be performed concurrently. Each of the steps though may take different number of cycles to complete execution.

In conclusion, the present disclosure relates to a neural network processor configured to perform convolution operations on input data and N by N matrices, where N is a positive integer greater than one. The neural network processor may include a plurality of multiplier circuits. The neural network processor may further include a window expander circuit. The window expander circuit may include a first logic circuit configured to store a set of data elements, corresponding to at least a subset of the input data, into a Q number of logical memories, where each of a P number of data elements of the set of the data elements is stored in each of the Q number of logical memories, where P is an integer equal to or greater than one and Q is an integer equal to or greater than N. The window expander circuit may further include a second logic circuit configured to receive the first set of data elements and additional data elements corresponding to the subset of the input data from the Q number of logical memories and expand the at least the subset of the input data until the at least the subset of the input data is expanded based on a predetermined factor selected at least to increase utilization of the plurality of the multiplier circuits.

In this example, the first logic circuit may include a finite state machine configured to store the data elements corresponding to the at least the subset of the input data into the each of the Q logical memories. Each of the Q logical memories may comprise a random-access memory.

The second logic circuit may comprise a rotate circuit and an array structure. In addition, the vector register file may be configured to store expanded data.

In this example, the neural network processor may further be configured to receive the input data via a PCI express bus. In another example, the neural network processor may further be configured to receive the input data from a vector data memory, where the vector data memory is configured to receive the input data via a PCI express bus.

In another example, the present disclosure relates to a method in a neural network processor configured to perform convolution operations on input data and N by N matrices, where N is a positive integer greater than one, where the neural network comprises a plurality of multiply circuits. The method may include automatically determining whether the input data received by the neural network processor requires expansion. The method may further include when the input data requires the expansion: (1) storing a first set of data elements, corresponding to at least a subset of the input data, into a Q number of logical memories, where each of a P number of data elements of the first set of the data elements is stored in each of the Q number of logical memories, where P is an integer equal to or greater than one and Q is an integer equal to or greater than N, (2) shifting the first set of data elements from the Q number of logical memories into a first column of an array structure and storing a second set of data elements, corresponding to the subset of the input data, in the Q number of logical memories, (3) shifting the first set of the data elements from the first column of the array structure into a second column of the array structure and shifting the second set of data elements from the Q number of logical memories into the first column of the array structure, and (4) repeating storing and shifting steps using additional data elements corresponding to the subset of the input data until the subset of the input data is expanded based on a predetermined factor selected at least to increase utilization of the plurality of the multiplier circuits.

The storing and the shifting steps may be performed using a window expander circuit comprising a first logic circuit, where the first logic circuit comprises a finite state machine configured to store the data elements corresponding to the at least the subset of the input data into the each of the Q logical memories. Each of the Q logical memories may include a random-access memory. The window expander circuit may further include a rotate circuit coupled between the Q logical memories and the array structure.

The method may further include storing expanded data into a vector register file corresponding to the neural network processor. The method may further include receiving the input data via a PCI express bus. In another example, the method may include receiving the input data from a vector data memory, where the vector data memory is configured to receive the input data via a PCI express bus.

In yet another example, the present disclosure relates to a neural network processor configured to perform convolution operations on input data and N by N matrices, where N is a positive integer greater than one. The neural network processor may include a plurality of multiplier circuits and a window expander circuit. The window expander circuit may include a first logic circuit configured to store a set of data elements, corresponding to at least a subset of the input data, into a Q number of logical memories, where each of a P number of data elements of the set of the data elements is stored in each of the Q number of logical memories, where P is an integer equal to or greater than one and Q is an integer equal to or greater than N.

The window expander circuit may further include a second logic circuit configured to receive the first set of data elements from the Q number of logical memories and expand the at least the subset of the input data until the at least the subset of the input data is expanded based on a predetermined factor, where the second logic circuit comprises a rotate circuit and an array structure.

The first logic circuit may comprise a finite state machine configured to store the data elements corresponding to the subset of the input data into the each of the Q logical memories. Each of the Q logical memories may comprise a random-access memory.

In addition, the rotate circuit may be configured to selectively rotate the at least the subset of the input data before providing the at least the subset of the input data to the array structure. The extent of the rotation of the at least the subset of the input data may be determined based on a stride associated with the convolution operations.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A neural network processor configured to perform convolution operations on input data and N by N matrices, wherein N is a positive integer greater than one, the neural network processor comprising:
    a plurality of multiplier circuits;
    a window expander circuit comprising:
        a first logic circuit configured to store a set of data elements, corresponding to at least a subset of the input data, into a Q number of logical memories, wherein each of a P number of data elements of the set of the data elements is stored in each of the Q number of logical memories, wherein P is an integer equal to or greater than one and Q is an integer equal to or greater than N, and
        a second logic circuit configured to receive the set of data elements corresponding to the subset of the input data from the Q number of logical memories and expand the at least the subset of the input data until the at least the subset of the input data is expanded to form expanded data;
    a matrix register file configured to store matrix data corresponding to the N by N matrices; and
    a vector register file configured to receive the expanded data from the window expander circuit and store the expanded data, wherein each of the plurality of multiplier circuits is configured to receive at least a subset of matrix data from the matrix register file and at least a subset of the expanded data from the vector register file and perform convolution operations using the subset of the matrix data and the subset of the expanded data.

2. The neural network processor of claim 1, wherein the first logic circuit comprises a finite state machine configured to store the data elements corresponding to the at least the subset of the input data into the each of the Q logical memories.

3. The neural network processor of claim 2, wherein the each of the Q logical memories comprises a random-access memory, and wherein the subset of the input data is expanded based on a predetermined factor selected at least to increase utilization of the plurality of the multiplier circuits.

4. The neural network processor of claim 1, wherein the second logic circuit comprises a rotate circuit and an array structure.

5. The neural network processor of claim 1 further comprising a multiplexer configured to receive the expanded data and selectively provide the expanded data to the vector register file configured to store the expanded data.

6. The neural network processor of claim 1 further configured to receive the input data via a PCI express bus.

7. The neural network processor of claim 1 further configured to receive the input data from a vector data memory, wherein the vector data memory is configured to receive the input data via a PCI express bus.

8. A method in a neural network processor configured to perform convolution operations on input data and N by N matrices, wherein N is a positive integer greater than one, wherein the neural network comprises a plurality of multiply circuits, the method comprising:
    automatically determining whether the input data received by the neural network processor requires expansion; and
    when the input data requires the expansion: (1) storing a first set of data elements, corresponding to at least a subset of the input data, into a Q number of logical memories, wherein each of a P number of data elements of the first set of the data elements is stored in each of the Q number of logical memories, wherein P is an integer equal to or greater than one and Q is an integer equal to or greater than N, (2) shifting the first set of data elements from the Q number of logical memories into a first column of an array structure and storing a second set of data elements, corresponding to the subset of the input data, in the Q number of logical memories, (3) shifting the first set of the data elements from the first column of the array structure into a second column of the array structure and shifting the second set of data elements from the Q number of logical memories into the first column of the array structure, and (4) repeating storing and shifting steps using additional data elements corresponding to the subset of the input data until the subset of the input data is expanded to form expanded data;
    storing matrix data in a matrix register file; and
    receiving into a vector register file the expanded data from the window expander circuit and storing the expanded data into the vector register file, wherein each of the plurality of multiplier circuits is configured to receive the matrix data from the matrix register file and the expanded data from the vector register file and perform convolution operations using the matrix data and the expanded data.

9. The method of claim 8, wherein the storing and the shifting steps are performed using a window expander circuit comprising a first logic circuit, wherein the first logic circuit comprises a finite state machine configured to store the data elements corresponding to the at least the subset of the input data into the each of the Q logical memories.

10. The method of claim 9, wherein the each of the Q logical memories comprises a random-access memory, and wherein the subset of the input data is expanded based on a predetermined factor selected at least to increase utilization of the plurality of the multiplier circuits.

11. The method of claim 9, wherein the window expander circuit comprises a rotate circuit coupled between the Q logical memories and the array structure.

12. The method of claim 8 further comprising storing expanded data into a vector register file corresponding to the neural network processor.

13. The method of claim 8 further comprising receiving the input data via a PCI express bus.

14. The method of claim 8 further comprising receiving the input data from a vector data memory, wherein the vector data memory is configured to receive the input data via a PCI express bus.

15. A neural network processor configured to perform convolution operations on input data and N by N matrices, wherein N is a positive integer greater than one, the neural network processor comprising:
- a plurality of multiplier circuits;
- a window expander circuit comprising:
  - a first logic circuit configured to store a set of data elements, corresponding to at least a subset of the input data, into a Q number of logical memories, wherein each of a P number of data elements of the set of the data elements is stored in each of the Q number of logical memories, wherein P is an integer equal to or greater than one and Q is an integer equal to or greater than N, and
  - a second logic circuit configured to receive the first set of data elements from the Q number of logical memories and expand the at least the subset of the input data until the at least the subset of the input data is expanded to form expanded data, wherein the second logic circuit comprises a rotate circuit and an array structure;
- a matrix register file configured to store matrix data corresponding to the N by N matrices; and
- a vector register file configured to receive the expanded data from the window expander circuit and store the expanded data, wherein each of the plurality of multiplier circuits is configured to receive at least a subset of matrix data from the matrix register file and at least a subset of the expanded data from the vector register file and perform convolution operations using the subset of the matrix data and the subset of the expanded data.

16. The neural network processor of claim 15, wherein the first logic circuit comprises a finite state machine configured to store the data elements corresponding to the subset of the input data into the each of the Q logical memories.

17. The neural network processor of claim 16, wherein the each of the Q logical memories comprises a random-access memory.

18. The neural network processor of claim 15, wherein the rotate circuit is configured to selectively rotate the at least the subset of the input data before providing the at least the subset of the input data to the array structure.

19. The neural network processor of claim 18, wherein an extent of a rotation of the at least the subset of the input data is determined based on a stride associated with the convolution operations.

20. The neural network processor of claim 15, wherein the window expander circuit is configured to receive the input data via a PCI express bus.

* * * * *